(12) United States Patent
Lord

(10) Patent No.: US 7,790,129 B2
(45) Date of Patent: Sep. 7, 2010

(54) SET OF PROCESSES FOR REMOVING IMPURITIES FROM A SILCON PRODUCTION FACILITY

(75) Inventor: Stephen Michael Lord, Encinitas, CA (US)

(73) Assignee: Lord Ltd., LP, San Diego, CA (US)

( * ) Notice: Subject to any disclaimer, the term of this patent is extended or adjusted under 35 U.S.C. 154(b) by 1201 days.

(21) Appl. No.: 11/193,734

(22) Filed: Jul. 29, 2005

(65) Prior Publication Data

US 2007/0098612 A1    May 3, 2007

(51) Int. Cl.
*B01D 53/50* (2006.01)
(52) U.S. Cl. ................. 423/240 R; 423/210; 423/240 S
(58) Field of Classification Search ................. 423/210, 423/240 R, 240 S
See application file for complete search history.

(56) References Cited

U.S. PATENT DOCUMENTS

| | | | |
|---|---|---|---|
| 4,213,937 A | 7/1980 | Padovani | |
| 4,340,574 A | 7/1982 | Coleman | |
| 4,526,769 A | 7/1985 | Ingle | |
| 4,676,967 A | 6/1987 | Breneman | |
| 5,961,944 A * | 10/1999 | Aratani et al. | ............... 423/348 |
| 6,843,972 B2 | 1/2005 | Klein | |
| 2002/0081250 A1 * | 6/2002 | Lord | ............... 422/198 |

\* cited by examiner

*Primary Examiner*—Edward M Johnson

(57) ABSTRACT

Two low cost processes for removing boron, phosphorus, carbon and titanium during the process of converting metallurgical grade silicon to electronic grade silicon are described. A first process removes boron and titanium by using one or more high temperature solids removal devices for the removal of solid titanium diboride from a halosilane reactor effluent stream where the high temperature is greater than about 200° C. A second process removes carbon as methane and phosphorus as phosphine by means of a membrane separator which processes all or part of a hydrogen recycle stream to recover hydrogen while rejecting methane and phosphine.

10 Claims, 4 Drawing Sheets

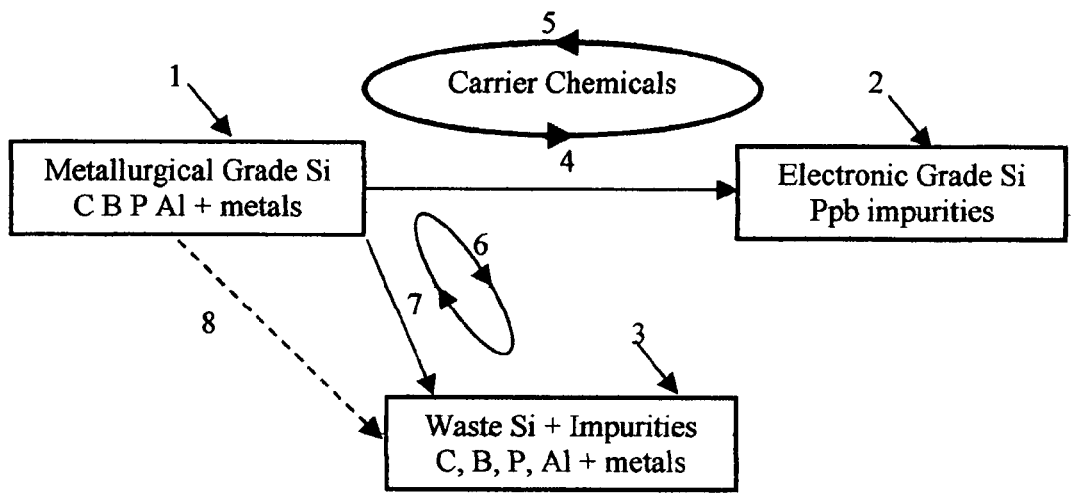
Fig 1. Conceptual Schematic of Overall Process
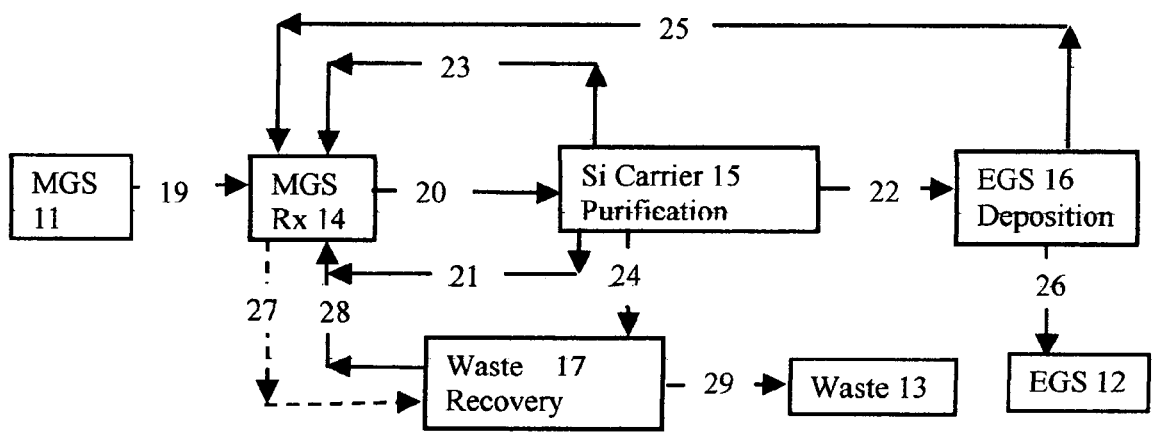
Fig 2. Process Schematic of Overall Process

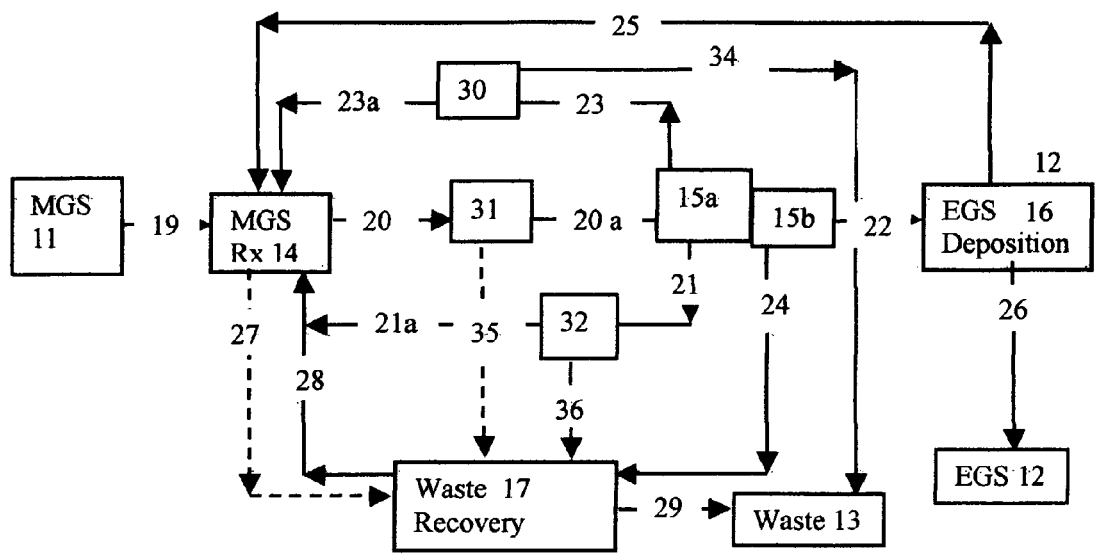
Fig 2a New Process Schematic
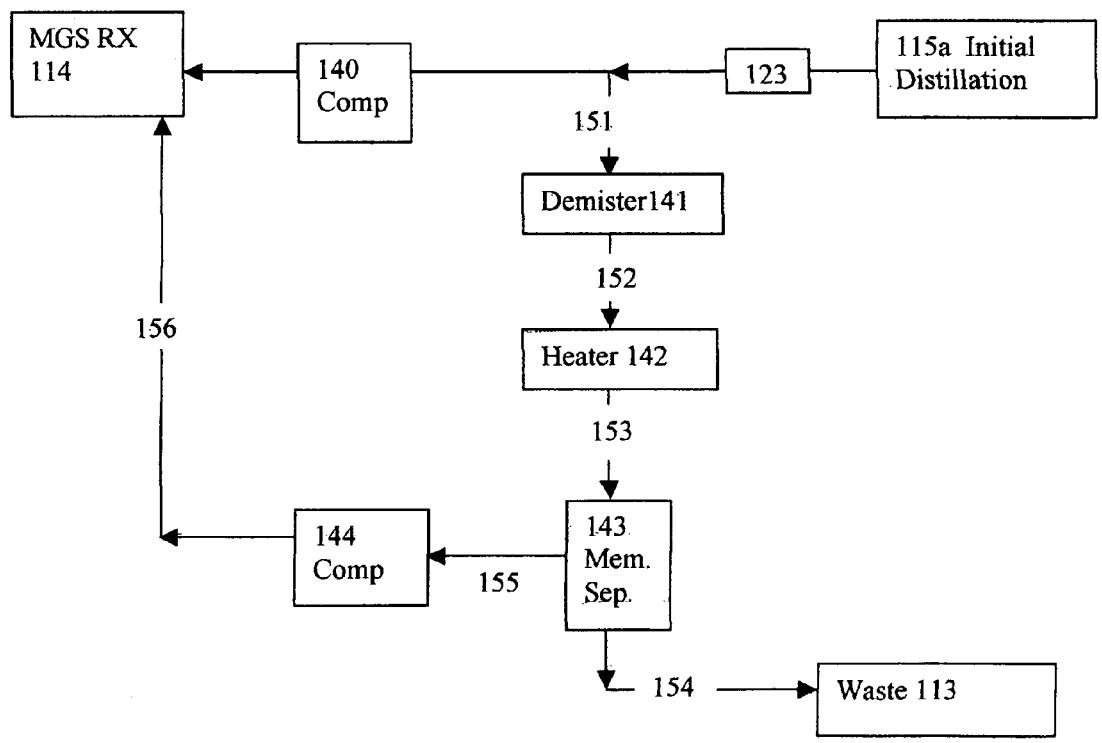
Fig 3 Example of Membrane Separator, with bypass

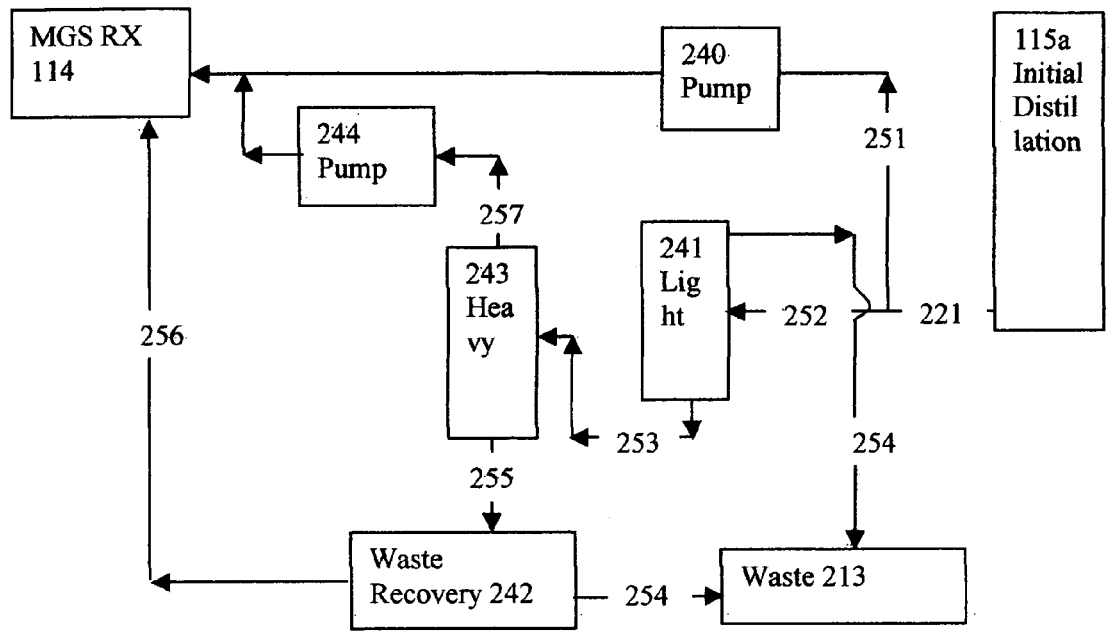
Fig 4a. Example of Removal of Impurities from recycle TBS
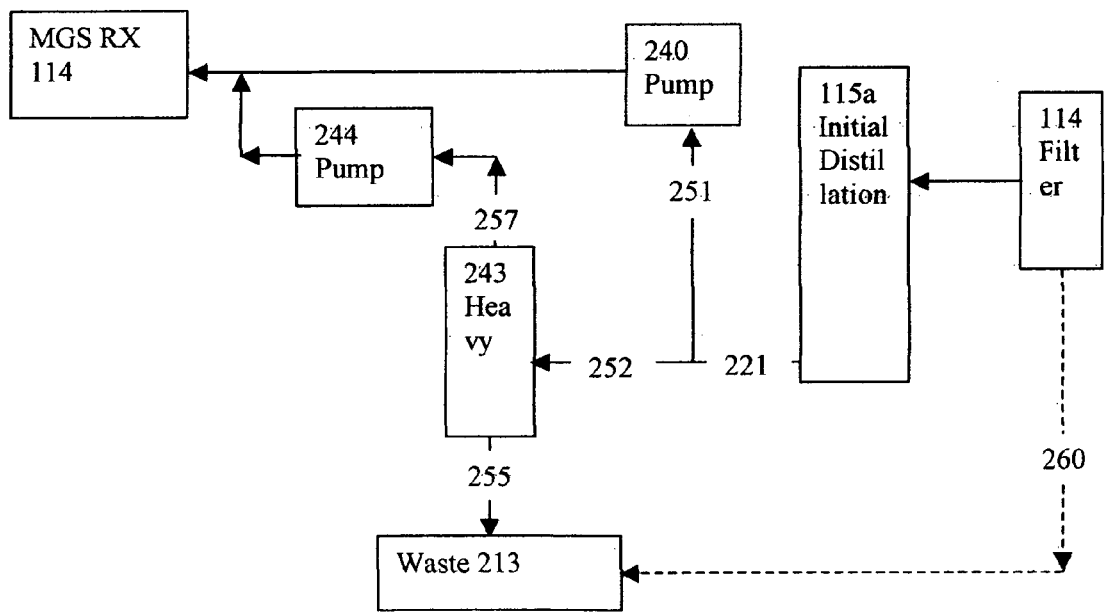
Fig 4b Example of Removal of Impurities from recycle STC

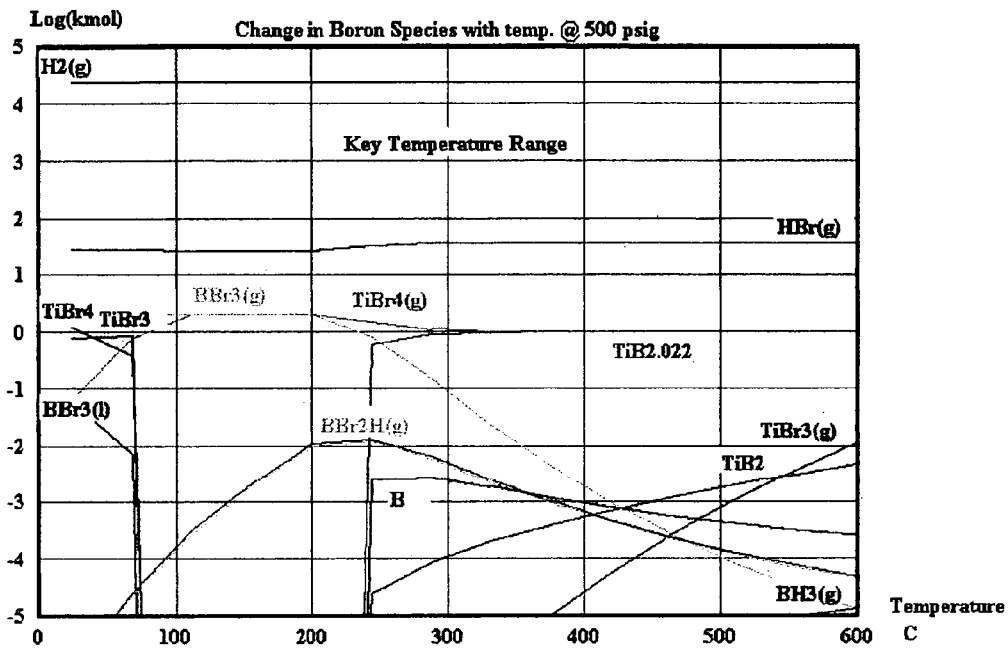
Fig 5 Boron Species in Reactor Effluent as it cools
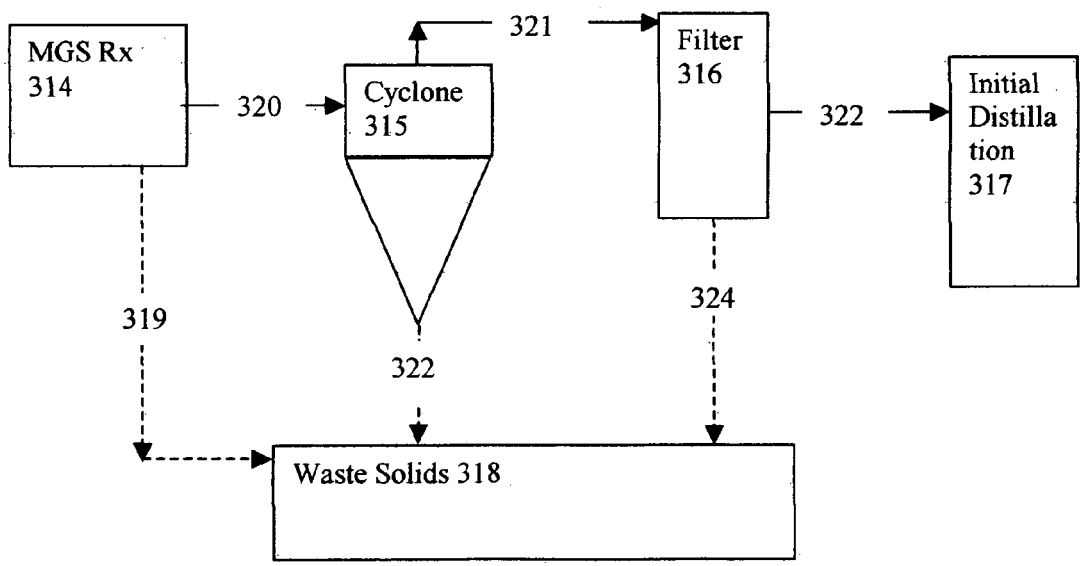
Fig 6 Example of removal of solid boron species from reactor effluent

SET OF PROCESSES FOR REMOVING IMPURITIES FROM A SILCON PRODUCTION FACILITY

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of high purity silicon production and within that field to the conversion of metallurgical grade silicon to electronic grade silicon and yet more specifically to a set of three processes for removing impurities from a silicon production facility. One or more of the processes may be used to prevent buildup of impurities in recycle streams and to provide a purer and more stable feedstock to the final purification steps of the standard distillation techniques commonly used to purify a high purity silicon containing gas, which is then used to produce high quality silicon in a deposition reactor, The locations where the impurities are removed are called sinks and the locations where they enter are called sources. Other definitions and abbreviations are;

MCS; monochlorosilane, $SiH_3Cl$
DCS; dichlorosilane, $SiH_2Cl_2$
TCS; Trichlorosilane, $SiHCl_3$
STC; Silicon Tetrachloride, $SiCl_4$
MBS; monobromosilane, $SiH_3Br$
DBS; dibromosilane, $SiH_2Br_2$
TBS; Tribromosilane, $SiHBr_3$
SBC; Silicon Tetrabromide, $SiBr_4$
MGS; Metallurgical Grade Silicon
EGS; Electronic Grade Silicon
MTCS; Methyl trichlorosilane, $Si(CH_3)Cl_3$
MTBS; Methyl tribromosilane, $Si(CH_3)Br_3$
$H_2$; Hydrogen gas
HCl: Hydrogen chloride gas
HBr; Hydrogen Bromide gas
$Cl_2$; Chlorine gas
$Br_2$; Bromine gas
Ppm wt is parts per million by weight
Ppma is parts per million atomic
Ppba is parts per billion atomic The majority of high purity electronic grade silicon is produced from metallurgical grade silicon, MGS, which is approximately 98% pure. The process converts the solid silicon into a liquid material, which can be purified then decomposed back to silicon. The initial material is usually trichlorosilane, TCS, although tribromosilane, TBS, has been used and triiodosilane, SiHI3, could be used. The process involves using carrier chemicals to transform the solid silicon and recycling the carrier chemicals to reduce waste as is shown in FIG. 1. Some carrier chemicals must be used to reject the impurities, which are Carbon, C; Boron, B; Phosphorus, P; Aluminum, Al; and other metals. Minimizing the loss of the carrier chemicals for the waste is also desirable. Carrier chemicals consist of silicon, hydrogen, and a halogen, usually chlorine, in various combinations such as $H_2$, STC,TCS,DCS,MCS, HCl and $Cl_2$, $SiH_4$, $H_2$, etc and in a bromine based system the equivalent bromine analogs. The initial reactors to produce the trichlorosilane were called Siemens reactors and reacted HCl with silicon to form TCS in high, 90%+yield with some STC byproduct, the silicon deposition reactors reacted the TCS with hydrogen to form silicon, some byproduct STC and HCl which was recycled to the Siemens reactor. A detailed example of this silicon refinery approach can be seen in Padovani U.S. Pat. No. 4,213,937, which shows the complexity of the process needed to close the recycle and deal with the byproduct STC. The disposal of the byproduct STC was generally recognized as a problem and various methods arose to convert it back to TCS or to silica and HCl. Ingle, U.S. Pat. No. 4,526,769 shows a process which recycles STC, hydrogen and HCl to a two stage reactor. Breneman, U.S. Pat. No. 4,676,967, shows a process which recycled only STC and hydrogen to a reactor full of MGS and reacted them to form a mixture of TCS, STC, hydrogen and hydrogen chloride and then provided for the progressive disproportionation of TCS to silane, SIH4, and STC which was then recycled to the reactor, the silane was decomposed to silicon and hydrogen, which was recycled. Further information on impurity removal in this same process is provided in Coleman, U.S. Pat. No. 4,340574, which mentions providing a small, 0.01-0.1%, purge stream from the columns used in the disproportionation part of the process.

The prior technology purification approach is primarily distillation of the silicon depositing gas, typically TCS but also TBS and SIH4 to very high purity levels. There are also processes to remove some impurities by using adsorbents. Ingle provides for removal of MGS that is carried over from the reactor and for distillation and chemical purification of TCS. He also provides for distillation of the recycled Silicon tetrachloride. He does not provide for the solid aluminum trichloride and hence his proposed distillation scheme would fail. See column 7 line 2 "The chlorosilanes are separated by distillation in distillation column 78 which separates the lighter boiling constituents ($H_2SiCl_2$ and $HSiCl_3$, from the SICl4." It is apparent from the examples that the research conducted was on the dual stage reactor itself using once through chemicals, Thus the purity and operational problems of a closed recycle system using $SICl_4$ would not have been apparent, and hence were not dealt with in a feasible manner. Ingle also distills all of the recycled $SiCl_4$ which is not required or optimal. Breneman provides for condensing a small portion of the STC from the reactor to trap carried over MGS and metal halides which are then sent to waste and do not require additional dilution prior to hydrolysis and specifically mentions in column 15 line 54 that "Any boron trichloride, boiling point, −12° C., that was not removed in said sludge or retained on the ion exchange resin could be removed from the silane in said purification zone". Klein et al, U.S. Pat. No. 6,843,972 provides for adsorption of impurities in TCS using a solid base. In the prior technology the primary goal of purification is to remove impurities from the silicon depositing gas. Further goals are that the carrier chemicals are preferably recycled with minimum waste and that the impurities are also rejected with minimum waste of carrier material. Breneman states in column 6 line 44 "All of the byproduct materials are recycled for further use, . . ." The purity levels required are very high, often parts per billion or higher which are very difficult to detect directly and consequently may require use of redundant purification steps. Breneman notes in Col 12 line 60 " . . . the product silane is of semiconductor purity, having impurities present at parts per billion levels, rather than at levels on the order of about 0.05% or 500 parts per million. It will also be appreciated that such purification steps as indicated herein might in proactive, constitute redundant features useful primarily on that basis". Coleman claims in column 20 line 30 "the improvement which comprises bleeding a portion of the trichlorosilane-rich bottom stream of (iii) said bleed portion containing one or more of BCl3, PCl3 and AsCl3 impurities and adding said portion to the unreacted silicon tetrachloride bottom recycle stream of (iv) and bleeding a portion of the chlorosilane-rich bottom stream of (viii) said bleed portion containing one or more of B2H6, PH3 and AsH3 impurities and adding said portion to the unreacted silicon tetrachloride bottom recycle stream of (iv), wherein the respective bleed portions of the trichlorosilane-rich bottom stream of (iii) and chlorosilane-rich bottom stream of (Viii) are 0.01 to 0.1 percent of their respective bottom streams."

A major problem in the prior art is that the purification is primarily of the material typically SiHCl3 or SiH4 or SiHBr3, used for the final silicon deposition. Not surprisingly some of the impurities found in the TCS, TBS or SiH4 are very close chemically and in physical properties to the pure material and the purification required is very high which requires significant loss of product to remove the impurities. Thus distillation columns to remove these impurities tend to be large and expensive to run. Additional columns may be needed because of unexpected difficulties or as redundant systems to compensate for the difficulty of reliably obtaining the needed high purity as noted by Breneman above.

A further problem is that there is no effort to deliberately remove impurities as solids from the effluent gas stream from the reactor. There are some references to removing solid waste, primarily MGS, from the reactor effluent, which consists of a mixture of DCS,TCS STC, hydrogen and hydrogen chloride. Ingle provides a gas solid separator, after the 2nd stage of the reactor, which operates at 300-350° C. and 25-60 psi, whereas Breneman provides for a scrubber where condensation of a small amount of the STC in the stream knocks out the solids. Breneman claims that this stream may contain $BCl_3$, boron trichloride, BP −12° C. but the method of obtaining the purge stream is to condense a small portion of the STC while avoiding condensing the desired TCS. The boiling points of both TCS, 31.7° C. and STC, 57.3° C. are considerably higher than $BCl_3$ so the $BCl_3$ would preferably stay with the uncondensed TCS. These solid removal steps are primarily done to remove solid silicon carryover from the reactor, not to remove impurities A yet further problem is the problem of impurity buildup in recycle streams. The only notes with regard to the effect of recycle streams on purification is by Coleman where he provides for very small purges, 0.01-0.1%, which are then recycled back to the hydrogenation reactor. As noted earlier Ingle does provide for distillation of the recycle STC but not in a realistic manner since he does not provide for filtration of aluminum chloride despite the fact it is the single largest impurity in the STC stream. Thus here are no realistic processes to remove impurities from the recycle streams other than by purge stream. There are processes to separate the recycle gas streams into hydrogen and hydrogen chloride but both streams are still recycled without any attempt to remove impurities. Since the impurities are not removed they will tend to build up in the recycle loops and thus be in greater concentration in the reactor where they will in turn produce greater concentrations of those impurity species which tend to have similar properties to TCS and thus have to be removed in the expensive TCS distillation system. Hence it can be seen that over a period of time the purity of the TCS will tend to decrease unless the columns are operated at higher reflux ratio but this reduces the throughput and measurement of trace impurities in high purity TCS is very difficult and time consuming so it is hard to control the column at a fixed purity if the inlet impurity concentration is increasing.

A basic deficiency in the prior art is that no system wide analysis is conducted to identify the best locations for the impurity sinks. Frequently the location of the sinks may not be known. The process is very much based on trial and error with copying of techniques, which seem to work without detailed understanding of why they work. Often there can be surprise peaks in impurities after several months of stable operation. The chlorine-based system has a particular problem with the aluminum impurity aluminum trichloride since it does not have a liquid phase and so cannot be distilled. This material tends to form solids, which drop out in tanks, which thus have to be periodically cleaned. This solid is also a Lewis acid and so can form temporary temperature dependent complexes with phosphorus impurities such as $PH_4Cl$ which itself is only stable as a solid, decomposing to PH3 and HCl on heating. A period of cold weather may provide high purity then warming may stimulate phosphorus contamination. Alternatively a filter with this material in may be hit with a warmer than usual stream and contaminate it. Similar problems apply to boron contamination. In some processes such as the silane process there is no designated sink for boron, it may go through its own disproportionation process and emerge as diborane, $B_2H_6$, to be removed with hydrogenated carbon compounds such as methane, ethane and ethylene from the silane by cryogenic distillation or it may bind to the ion exchange resin catalyst. Carbon is present in TCS as the methyl analogues of chiorosilanes, methylchlorosilane, $CH_3SiCl_3$, MTCS dimethylchlorosilane, $(CH_3)_2SiCl_2$ and the bromine analogs in TBS. It may be removed in distillation, but its chemical similarity to the TCS and STC suggest the likelihood of azeotrope formation and even more difficult separation. In the silane system carbon tracks the silicon in forming methane and other hydrocarbons in the silane from the carbon containing species in the TCS.

The ultimate goal of purification is to remove impurities from metallurgical grade silicon (MGS) and make high purity silicon but the removal of the impurities is not seen as the goal, instead the goal is to make high purity material. Thus a primary deficiency in the prior technology is that the sources and sinks are not closely identified so they may be monitored to prevent surprise buildups. A further major deficiency is that the carrier chemicals are preferably recycled with minimum waste but no effort is made to evaluate impurity buildup or remove impurities from these streams. A yet further deficiency is the failure to evaluate the whole system and select the optimum location for the sinks. A yet further deficiency is the failure to provide for bypasses on recycle stream so that only a portion of the stream need be purified.

BRIEF SUMMARY OF THE INVENTION

The primary object of the invention is to provide a consistent way to remove the impurities from the overall system.

Another object of the invention is to prevent change in impurity concentrations due to build up in recycle loops.

Another object of the invention is to remove impurities in the most cost efficient locations for that particular impurity.

A further object of the invention is to reduce the impurities in the feed to the high purity distillation steps.

Yet another object of the invention is to remove both the hydride and the halide forms of the impurities Still yet another object of the invention is to reduce the cost of the process.

Another object of the invention is to reduce the waste from the process.

Another object of the invention is to use the halogen recovery system to improve impurity removal A further object of the invention is to have clearly identified sinks for all impurities.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a process for removing boron impurities from a silicon production facility comprising the steps of: providing one or more high temperature solids removal means to remove boron as solid titanium diboride from a reactor effluent stream containing primarily halosilanes, hydrogen and hydrogen halides by preventing substantial contact between the titanium diboride and the hydrogen halide below a reaction temperature where the reaction temperature is preferably greater than 200° C., more preferably greater than 300° C. and most preferably greater than 400° C.

In accordance with a preferred embodiment of the invention, there is disclosed a process for removing certain carbon, primarily methane, and/or phosphorus, primarily phosphine, impurities from a silicon production facility comprising the steps of: cooling a reactor effluent stream containing primarily halosilanes, hydrogen and hydrogen halides, condensing more than 50% of the halosilanes, separating the preponderance of the uncondensed gases from the condensed liquids and passing some or all the gases through a membrane system to remove greater than 50% of any methane present and/or any phosphine present, and recovering greater than 50% of the hydrogen present.

In accordance with a preferred embodiment of the invention, there is disclosed a process for removing certain carbon, phosphorus and metal impurities from a silicon production facility comprising the steps of: separating the halosilanes into at least two streams one low boiling and one high boiling, which latter stream also contains the preponderance of any carbon, phosphorus and metal impurities and then further processing all or part of the latter stream to provide a stream containing the preponderance of the high boiling halosilanes with less than 50% of the incoming impurities and one or more streams concentrated in impurities.

In a modified embodiment of the above process suitable for chlorosilanes only, an additional step is provided for removal of aluminum as aluminum trichloride by filtration of one or more liquid halosilanes stream.

In a yet further modification of this embodiment suitable only for bromosilanes a stream containing a mixture of TBS and STB , which contains the carbon impurity, MTBS is removed from the system and sent to waste.

Yet further modifications of this embodiment may be provided to obtain this stream as will be apparent to someone familiar with the art of removing impurities, which occur between the boiling points of the major components entering a distillation process. Such modifications include but are not limited to; removing a stream from the initial separation device which is located between the withdrawal points of the low boiling and high boiling components; allowing the impurity MTBS to enter the low boiling stream and then removing it from the low boiling stream in a further separation process and allowing the impurity MTBS to enter the high boiling stream and then removing it from the high boiling stream in a yet further separation process.

As part of this overall process it is anticipated that further techniques will be provided to provide the required high purity material for deposition and that techniques will also be provided to recover all or part of the halogen present in the waste streams and to circulate recycle streams providing only that the design of the waste recovery system provides sinks for all the impurities and does not recycle significant quantities of impurities to the system with the recovered halogen. Significant is defined in relationship to the amount of impurities entering the MGS reactor from other sources and should be below 50% and preferably below 10% and most preferably below 1%. It will be apparent to those familiar with the art that the purpose of removing impurities to a waste recovery unit is defeated if the design of the unit recycles the impurities and that various techniques exist to prevent this. Such techniques include but are not restricted to selecting certain streams to bypass the halogen recovery step altogether, and designing impurity removal steps into the halogen recovery portion of waste recovery.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a conceptual schematic of the process of converting metallurgical grade silicon to electronic grade silicon.

FIG. 2 is a process schematic of the process of converting metallurgical grade silicon to electronic grade silicon with more detail of the recycle of the carrier chemicals.

FIG. 2a is a modification of FIG. 2 to show the new process schematic with the location of the three new processes and the new waste streams.

FIG. 3 is an example of the Membrane Separator process.

FIG. 4a is an example of the High boiling Halosilane impurity removal process as applied to a bromosilanes based process.

FIG. 4b is an example of the High boiling Halosilane impurity removal process as applied to a chlorosilanes based process.

FIG. 5 is a chart illustrating the change in boron species with temperature as the reactor effluent cools.

FIG. 6 is an example of the removal of solid boron species from reactor effluent.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Turning first to FIG. 1 . . . there is shown a conceptual schematic of the overall process to convert metallurgical grade Silicon, MGS, to electronic grade silicon, EGS. The MGS shown in box 1 contains impurities, Carbon, C, Boron, B, Phosphorus, P, Aluminum, Al, and other metals. The goal of the process is to split this material into EGS, Box 2, with virtually no impurities and waste silicon with all the impurities, Box 3. The required purity is so high that the separation needs to occur at the molecular level thus carrier chemicals, 4 and 6, are used to transport silicon atoms to the EGS box, 2, and impurity atoms to the waste box, 3, respectively. After carrying the silicon or impurity atoms to their desired location the carrier chemicals are returned to perform the transport again, 5 and 7. In practice the EGS contains parts per billion levels of impurity and the waste may be mostly silicon with ppm or a low percentage of impurities. The most common carrier chemicals are hydrogen and a halogen, which may be chlorine, bromine or iodine. These carrier chemicals combine with the silicon to form silicon rich materials, 4, which are purified then decomposed to EGS, 2 and silicon poor materials, 5, which are returned to react again with the MGS. While these carrier materials react with the MGS they also react with the impurities and these impurities are separated out then the impurity rich stream, 6, is transported to a waste deposition process, 3, and the impurity poor materials, 7, are transported back to the MGS for further reaction. In this process the silicon is converted from a solid to a room temperature liquid, which can be distilled to high purity then decomposed. The impurities may be transformed to a variety of species, which may be solid, liquid or gas and which may be halides, hydrides, hydrohalides or contain silicon in addition to halides and hydrogen. As can be seen conceptually the impurity poor stream returning to the MGS reactor may contain significant amounts of impurities. Since the impurity separation is not absolute but is instead a fractional split of the impurities between the EGS, 2, and the waste, 3, an increase in the amount of impurities, caused by recycle of impurities, will increase the impurities in the EGS. It is important to note that the dashed line 8. represents the many impurities that are allowed to build up in the reactor and only removed periodically when the reactor is emptied and refilled.

Now turning to FIG. 2 there is shown the basic way in which the concepts in FIG. 1 are implemented, using the four basic processes; the MGS reactor, 11, silicon carrier purification, 15, the EGS deposition, 16 and waste recovery, 17. The MGS, 11, is added, 19, to a reactor, 11, which uses recycle streams 21, 23, 25 and 28 to produce a reactor effluent stream, 20. This stream contains unreacted silicon and liquid and gaseous carrier chemicals as well as the desired silicon containing material, usually TCS, which is used in deposition. Part of the purification process separates out the liquid, 21 and gaseous, 23 carrier streams for recycle. The remaining part purifies the desired silicon containing material, usually TCS but also SIH4 and TBS, and rejects the impurities in stream 24 to the waste recovery process, 17. The pure silicon containing material, 22, is then sent to the EGS deposition reactor, 16, where it is converted to EGS, 26, and removed for sale as EGS, 12. The carrier chemicals formed in the EGS deposition reactor, 16, are recycled, stream 25 to the MGS reactor, 14. This schematic shows clearly that there are several streams, 21, 23, 24 and 27 that are likely to contain impurities but in the prior art only stream 24 and 27 are processed to remove impurities. It is also obvious that stream 20 which contains all the impurities is not processed to remove impurities prior to the silicon carrier purification, 15.

In accordance with the present invention, FIG. 2a shows the schematic of FIG. 2 with the addition of three separate processes, 30, 31 and 32, which produce impurity rich streams, 34, 35 and 36, which are sent to the waste unit, 17 to deposit the wastes in the waste disposal unit, 13, and recycle the carrier chemicals through stream 28. Stream 28 may be a single stream or several sub streams, which contain one or more of the carrier chemicals and are returned to react with the MGS. The silicon carrier purification, 15 in FIG. 2, is split into, the initial purification, 15a and a final purification, 15b. This shows the origin of the various waste and recycle streams in more detail.

Process 30 is on the light boiling recycle gaseous stream, which contains light boiling impurities. These are typically hydrides such as phosphine, PH3, arsine, AsH3 and methane. The stream, 23, contains the carrier chemicals hydrogen and hydrogen chloride both of which can be separated from methane and other hydrides using a membrane separator to form a more pure stream, 23a. The hydrogen and hydrogen chloride diffuse through the membrane faster than the hydrides so an impurity rich stream, 34 can be sent to the waste unit, 13. The waste unit may further process the waste to prevent deleterious chemicals entering the environment but does not recycle carrier chemicals. The initial purifier 15a is typically a distillation column cooled by cooling water or refrigerant and the outlet stream, 23, will be reasonably close to the temperature of the cooling stream i.e. no more than about 50° C. which is below the maximum operating temperature, approximately 100° C., of most suitable membranes. However it will contain small droplets that should be removed by a demisting device and some reheating of the stream.

Process 31 is on the main gaseous effluent from the reactor and is a gas solids separator to remove solid impurities, stream 35. These impurities are boron rich materials such as titanium diboride. The titanium diboride exits the reactor in equilibrium with hydrogen bromide and boron tribromide. The equilibrium is temperature dependent with the highest fraction of the boron captured as the solid titanium diboride at the highest temperature. Thus the solids separator should be as close to the reactor temperature as is feasible and economic. One method may include an initial separator inside the reactor which recycles the material to the reactor where it builds up until removed in the reactor ash during a shutdown combined with an external separator which is heavily insulated or even heated to prevent significant temperature drop outside the reactor. This latter separator removes the titanium diboride on an ongoing basis thus reducing the buildup of boron impurities inside the reactor. The solids are removed periodically and transported, stream 35, to the waste recovery process, 17, as shown or to waste disposal, 13.

Process 32 is on the heavy boiling liquid recycle stream, 21, which contains heavy boiling impurities. These are typically halides such as PCl3, PBr3, Al2Br6 and other metal halides and also methyl halosilanes such as Si(CH3)Cl3 or Si(CH3)Br3. The main carrier chemical is STC. The waste stream, 36, is sent to waste recovery, 17, for recovery of halogens, which are recycled via stream, 28, to the MGS reactor, 14. The stream 36 may consist of several sub streams depending on the impurity properties and impurity removal methods. The easiest separation technique is distillation and it is possible to produce a light boiling stream, containing impurities lighter than the carrier, STC or STB, and a heavy boiling stream, containing impurities heavier than the carrier, STC or STB. There are differences in application between the chlorosilanes and bromosilanes with methylchlorosilane having a higher boiling point than STC and methylbromosilane having a lighter boiling point than STB and aluminum chloride not forming a liquid phase while aluminum bromide does form a liquid phase. The STC purification requires an additional filtration step to remove the solid aluminum chloride. This step can be located anywhere in the purification process 15a and/or b or as part of process 32 once the reactor effluent has been cooled and the aluminum chloride condensed as a solid. The solids are removed periodically and transported as part of the stream 36 to the waste recovery process, 17. The STC process may not require a step to remove light boiling ingredients since methylchlorosilane has a higher boiling point than STC.

The waste recovery process, 17, is designed to remove the impurities and recover some of the carrier materials. There is also a periodic stream, 27, from the MGS reactor, 14, which consists of ash and unreacted silicon emptied from the reactor once or twice a year. The major fraction by weight of the carrier materials is the halogen so this is what is usually recovered. The halogen can be recovered as the element, as the hydrohalide or as a combination of the two. The important requirement is that this process provides clear sinks for the impurities that enter it so that the majority of the impurities entering the process are rejected and not recycled to the reactor as part of stream 5b. The impurities are rejected in stream 29 to the waste disposal unit, 13. This stream may consist of solids and gases that may require scrubbing which in turn creates more solids. The final waste solids usually consist of metal and non-metal oxides, hydroxides and halides and the vented gases, after scrubbing, are primarily hydrogen with some nontoxic carbon containing gases such as methane or carbon dioxide. The primary sink is thus the solids stream, which contains the boron, phosphorus, aluminum and other metal and non-metal impurities. The carbon sink is the gas stream.

Turning to FIG. 3 we see a more detailed embodiment of the uses of the membrane process with a bypass stream. In this example the high pressure saturated gaseous stream 123 from the initial distillation is split into two streams 124 and 151. Stream 124 is pressurized in a single stage compressor, 140, to form stream 125, which is recycled to the MGS reactor, 114. Stream 151 is then processed through a demister, 141, to remove some droplets, then a Heater, 142, to vaporize remaining droplets before entering a membrane separator, 143, to form a low pressure impurity poor stream, 155 and a high pressure impurity rich stream 154. Stream 155 is then recycled to the MGS via a multistage compressor reactor and stream 34 is sent to the waste disposal unit 113. Use of a bypass reduces the size of the purification system but only removes a fraction of the impurity. The impurity then builds up in the system until the fraction removed equals the amount that enters the system. Hence if half the stream is processed then the impurity builds up until the concentration is twice as much. If only a tenth is removed then the impurity builds up until it is ten times as much. Recycling impurities has an impact on the purification requirements of units 15a and 15b as shown in FIG. 1b where higher impurity concentrations increase the cost The choice of the amount of bypass is thus a choice made on economic grounds based on the optimum sizing of the membrane separator and its support equipment in conjunction with the other purification equipment impacted by the higher impurity concentration. The amount of material passing through the membrane separator and its performance can be adjusted by control of the entry pressure to the separator.

Now turning to FIG. 4a a similar economic balance is also required for the high boiling halosilane process, 32 in FIG. 2a. The example shown is for STB in a bromosilane process. The high boiling STB stream, 221, from the initial distillation, 115, is split into a bypass stream, 251, and a process stream 252. The bypass stream, 251, is pumped back to the MGS reactor, 114, by a pump 240. The stream 252 is distilled to produce a light stream, 254, containing light boiling impurities which are likely to contain carbon compounds and are sent directly to waste disposal unit, 213 to ensure disposal of the carbon and a heavy stream, 253. This stream is then fed to a heavy column, 243, where the overhead stream, 257, which is purified STB is pumped with a pump, 244, into the MGS Reactor, 114. The bottom stream is concentrated in phosphorus and metal bromides and is sent to waste recovery to recover the halogens. In the event that the waste recovery process is one that recovers elemental bromine as a condensed liquid then stream 254 can also be sent to recovery as the carbon dioxide will not condense with the bromine. Separation of carbon dioxide is not possible for a process recovering gaseous hydrogen bromide, unless some additional purifications means are provided to separate the carbon impurity species for disposal.

Turning to FIG. 4b we see the chlorosilane embodiment using the same numbering system as FIG. 4a. Observe that an additional unit, 114, is provided to filter out Aluminum trichloride solid before the initial distillation, 115 and that the light removal column 241 and the waste recovery is not required. All the wastes go to the waste disposal unit, 213. The reasons for this are that the heavy stream 255 now contains the carbon impurity MTCS and does not contain Aluminum trichloride, which is the largest single impurity and that STC can be obtained cheaply as a byproduct. Thus the most economic solution is to recover more STC in stream 257 and thus make stream 255 so small that halogen recovery is not worthwhile. The solid aluminum chloride stream, 260 is an intermittent stream and also of relatively small volume.

In general the economic balance based on a physical bypass is not performed for the boron removal process, 31 in FIG. 2a, instead it is based on the fraction of solids allowed to pass through the solids separator. The solid impurities have different particle sizes and it is progressively more difficult to remove the finer particles. The effluent gas will have a range of particle sizes and the fraction by weight of the particles in a given particle size range is called the particle size distribution. A given gas solids separator will have different collection efficiencies based on the particle size but the important figure of merit is the overall collection efficiency by weight as this will determine the buildup of impurities in the system, as discussed above, and hence will determine the impact on the downstream system. A further impact on the downstream system is provided by the equilibrium between the solid titanium diboride and the gaseous boron impurities as shown in FIG. 5. The fraction of the boron present as the solid decreases as the temperature decreases. Thus cold spots may drastically reduce the overall removal efficiency. The removal of the solid may also have an impact on the collection efficiency. If the solid is completely removed from contact with the gas then more solid will tend to precipitate from the gas, which improves the collection efficiency. If the collected solid remains in contact with the gas then it will tend to form more of the gaseous impurity. Turning to FIG. 5 we see a chart representing the different boron species present in the temperature range 0-600° C. Note gaseous species have a bracket with g inside, (g) following the chemical formula. The main species of interest are the solid species boron, B, and titanium borides, $TiB_2$ and $TiB_{2.022}$, and the gaseous species Boron tribromide, $BBr_3(g)$, and boron hydrogen dibromide, $BBr_2H$ (g). Of these boron tribromide, BP 91.7° C. is the key impurity species because it is the most difficult to remove from TBS, BP 111.8° C. It can be seen that the major specie above 300° C. is $TiB_{2.022}$ and that the key specie, $BBr_3(g)$ is about 1/10th of the $TiB_{2.022}$ at 300° C. Thus if we have 90% solids removal we will have 81% removal of the key boron species. If the temperature is raised to 350° C. the BBr3 is 1/100th of the $TiB_{2.022}$ thus 90% solids removal will provide 89% removal of the key boron species. If the temperature is 420° C., the $BBr_3$ is only 1/1000th of the $TiB_{2.002}$ thus 90% solids removal will provide 89.9% removal of the key boron species. Hence above 350° C. the solids removal efficiency is more important than the specific temperature. Since the downstream purification depends on the incoming concentration it is useful to look at the amount left in the gas stream. Hence an 81% recovery leaves 19%, an 89% recovery leaves 11% and an 89.9% leaves 10.1%. Thus moving the recovery from 81% to 89% reduces the purification requirements of the downstream equipment by a factor of almost two. An improvement of solids recovery to 95% at 350° C. reduces the residue to 5.1% whereas the same recovery at 300° C. would leave a residue of 14.5%, which is almost a factor of 3. As a general rule for such optimization the temperature dependent fractional recovery should be similar to the solid collection efficiency, which in turn depends on the particle size and the equipment itself. Thus from the FIG. 5, one can see that at 500° C., which is the typical outlet temperature of the reactor the equilibrium content of BBr3 is four orders of magnitude lower than the $TiB_{2.022}$, which is 99.99% boron recovery thus the particle collection efficiency should be around the same 99.99%. The overall efficiency would then be 99.98% or a residue of 0.02%.

Referring to FIG. 2a the economic benefit of such high boron recoveries lies in the reduction in the size of the downstream high purity separation process, unit 15b of FIG. 2a, and in reduction in the size of stream 24, which in turn increases stream 22 and results in increased silicon production, 26. It is possible also to direct all or part of stream 24 directly to the MGS reactor, 14, since the effect on boron recycling will be small. Further more it may be possible to redirect stream 24 to a separate EGS deposition system dedicated to producing a EGS material higher in boron, which may be used for solar material or as a dopant in crystal pulling.

Feasible solid gas separators are cyclones, filters and wet scrubbers. Of these wet scrubbers are not as suitable because the temperature inevitably falls when liquids are injected. Further more if the liquid is circulated the circulating liquid may contain solids and contribute to erosion of the piping. Cyclones can provide reasonably high collection efficiencies and are suitable for the temperature and pressure. Conventional fabric filters are limited by the operating temperature of the organic fabric and are therefore not suitable. High temperature sintered metal and ceramic filters are available and suitable.

Turning to FIG. 6 we see an example of the process as implemented with an external cyclone, 315, and filter, 315. The MGS reactor, 314, produces an effluent stream, 320, containing carried over silicon and solid and gaseous boron species together with halosilanes, halohydride and hydrogen. The cyclone has an efficiency of about 99% at 10 microns and removes most of the solids in stream 320 as solid stream, 322. The filter, 316, has an efficiency of 99% at 4 microns and removes the majority of the remaining particles as solid stream 324. The temperature of the cyclone and filter walls is maintained above 450° C. and the boron recovery as a solid is 99.99%. The overall recovery is about 99.98%. The residual boron in stream 322 is 0.02% of the incoming and the main species is $BBr_3$ once the stream is condensed. The overall purification requirement from the boron content of 0.02% by wt, 50 ppma, in the MGS to 0.5 ppba is 100,000. Removal of the solid boron species at the 99.98% efficiency reduces this by a factor of 5000 to only a factor of 20. This means that the boron removal column can be much smaller and that the waste stream can be much less. For solar grades of silicon where a 10 ppb silicon level is acceptable the boron column may not be needed. It is also possible that the light boiling DBS and DCS fraction that normally contains the boron halide and is rejected as waste for this reason could also be used for solar grade material. This could improve overall production of silicon by up to 10%.

EXAMPLES

1 A gas stream is to be produced from a degassing column at a composition of 3.5 SCFH H2SiCl2;2.4 SCFH HSiCl3; 51.5 HCl; 5407.5 H2;095 CH4 and 0.005 SCFH PH3 for a total of 5465 SCFH at a pressure of 470 psig and a temperature of 125 F(51° C.). The gas will be demisted in a demisting pad and reheated to 140 F(60° C.) and reduced in pressure to 400 psig then passed through a separator using a polysulfone membrane. The low-pressure stream will be produced at 25 psig with a composition of 0.1 SCFH H2SiCl2;0.1 SCFH HSiCl3;45 HCl; 4865 H2;005 CH4 and 0.001 SCFH PH3 for a total of 4910 SCFH (approx), the high pressure stream will be produced at 380 psig with a composition of 3.4 SCFH H2SiCl2;2.3 SCFH HSiCl3;6.5 HCl; 542.5 H2; 09 CH4 and 0.004 SCFH PH3 for a total of 555 SCFH (approx). Thus about 90% of the hydrogen and hydrogen chloride are recovered to the low-pressure stream and 90% of the methane and 80% of the phosphine are recovered to the high-pressure stream along with most of the chlorosilanes. The high-pressure stream is then depressurized and sent to a caustic scrubber where the chlorosilanes and phosphine are scrubbed and the hydrogen and methane are vented.

2 A gas stream is to be produced from a reactor at 500 psig and 500° C. The actual gas flow is 325 cu.ft/hr and the solids content is 1.34 lb/hr of silicon with about 650 ppm titanium diboride. The cyclone design efficiency is 99% at 10 microns. This is followed by a sintered metal filter with an efficiency of 98% at 4 microns. The cyclone and filter are both insulated with two inches of a high temperature pressed silica insulation to maintain a wall temperature of about 400° C. Gas temperature on exit from the filter is to be about 450° C. Overall boron removal efficiency is expected to be 99% with the Boron below detection levels i.e. less than 100 ppb. The solids are removed, dried with air and disposed of.

3 A liquid stream is to be produced from a distillation column that is primarily STB with traces of TBS and impurities. The composition is 11 lb/hr of TBS and 1475 lb/hr of STB. The impurities are 0.065 lb/hr of methyltribromosilane, 0.34 lb/hr of Aluminum tribromide and less than 0.01 lb/hr of other metal bromides. This stream enters a first distillation column which produces an over head stream with a composition of 11 lb/hr TBS, 0.06 lb/hr methyltribromosilane and 15 lb/hr of STB which is sent to waste recovery. The bottom stream comprising 0.05 lb/hr of methyl tribromosilane, 1445 lb/hr STB. 0.34 lb/hr of aluminum tribromide and less than 0.01 lb/hr other bromides is sent to a second column where the overhead stream comprises 0.05 lb/hr methyl tribromosilane, 1440 lb/hr STB and 0.001 lb/hr Aluminum tribromide, the bottoms stream comprises, 45 lb/hr STB and 0.339 lb/hr aluminum tribromide and 0.01 lb/hr other bromides. The bromosilane rich stream and the aluminum bromide rich stream are combined and sent to a bromine recovery process where they are oxidized with air to form gaseous bromine, carbon dioxide and solid oxides. The bromine is condensed and the nitrogen residual oxygen, and carbon dioxide are scrubbed of residual bromine and vented.

4 A liquid stream is to be produced from a degassing column that is a mixture of TCS,STC and impurities including solid aluminum trichloride. The composition comprises; 10.6 lb/hr DCS, 242 lb/hr TCS, 734 lb/hr STC, 3.83 lb/hr HCl, 9.8 lb/hr H2, 0.034 lb/hr methylchlorosilane, Si(CH3)Cl3, 0.05 lb/hr other bromides and 0.17 lb/hr aluminum chloride solid. The stream passes through a filter that removes 99% of the aluminum trichloride and into a distillation column that separates TCS and STC. The heavy boiling stream comprises, 3 lb/hr TCS, 734 lb/hr STC, 0.034 lb/hr methylchlorosilane, $Si(CH_3)Cl_3$ and 0.05 lb/hr other bromides. This is passed to another distillation column where the overhead stream is 3 lb/hr TCS, 715 lb/hr STC, and 0.004 lb/hr methylchlorosilane, $Si(CH_3)Cl_3$. The bottoms stream comprises 19 lb/hr STC, 0.03 lb/hr methylchlorosilane, $Si(CH_3)Cl_3$ and 0.05 lb/hr other bromides. The bottom stream and the solid aluminum chloride are hydrolyzed and the resulting hydrogen chloride is scrubbed. This is done to avoid carbon buildup and because silicon tetrachloride is a readily available low cost material.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A process for removing boron impurities from a silicon production facility comprising the steps of:
    providing one or more high temperature solids removal devices, and
    removing titanium diboride as a solid material from a gaseous reactor effluent stream containing primarily halosilanes, hydrogen and hydrogen halides, and feeding the solid material to a high temperature solids removal device, while preventing substantial contact between the removed titanium dibromide impurities and the hydrogen halide below a temperature of 250° C.

2. The process of claim 1 further comprising selecting a MGS feedstock which has an atomic ratio of titanium to boron in the reactor of at least 1:2.

3. The process of claim 1 wherein said solids removal device includes at least one solids removal device within the reactor.

4. The process of claim 1 wherein said solids removal device comprises one or more cyclones, filters or scrubbers.

5. The of claim 1 further comprising producing a boron containing high purity silicon material suitable for production of solar energy conversion cells.

6. A process for removing one or more of carbon and phosphorus impurities from a silicon production facility comprising the steps of:
    feeding a gaseous stream containing primarily halosilanes, hydrogen and hydrogen halides with traces of halosilanes, methane and phosphine into a membrane system containing a separation membrane to form
        a) a low pressure stream comprising a gaseous stream which has passed through the separation membrane, said low pressure stream comprising a first portion of the gaseous stream enriched in hydrogen and hydrogen chloride and depleted in halosilanes, methane and phosphine when compared to the gaseous feed stream, and
        b) a high pressure stream comprising a second portion of the feed gaseous stream which has not passed through the separation membrane said high pressure stream being depleted of hydrogen and hydrogen chloride and enriched in halosilanes, methane and phosphine when compared to the gaseous feed stream.

7. The process of claim 6 wherein the low pressure stream is fed back to the silicon production facility and the high pressure stream is discarded.

8. The process of claim 6 further comprising the step of
    a) providing a cooling system to form a condensate comprising at least a portion of the halosilanes in the high pressure gas stream and removing at least a portion of the condensate, producing a halosilane depleted high pressure stream, and
    b) providing a heating means to vaporize any residual liquids in the high pressure stream following the removal of the condensate, and
    c) feeding the heated high pressure stream to a membrane separation system.

9. The process of claim 6 wherein at least 50% of the hydrogen halide and hydrogen in the gaseous feed stream passes through the separation membrane and into the low pressure stream.

10. The process of claim 6 wherein said first portion of the gas stream is between between about 20% and 100% of the gaseous stream.

* * * * *